United States Patent

Burns et al.

[11] Patent Number: 6,023,921
[45] Date of Patent: Feb. 15, 2000

[54] ARRANGEMENT FOR LEVELING A MOWER HOUSING

[75] Inventors: John A. Burns, Franklin; Jeffrey D. Peek, Lawrenceburg, both of Tenn.

[73] Assignee: Murray, Inc., Brentwood, Tenn.

[21] Appl. No.: 09/055,965

[22] Filed: Apr. 7, 1998

Related U.S. Application Data

[60] Provisional application No. 60/043,007, Apr. 14, 1997.

[51] Int. Cl.[7] .............................. A01D 34/74; A01D 34/64
[52] U.S. Cl. .............................. 56/16.3; 56/17.1; 56/15.9; 56/DIG. 22
[58] Field of Search .................................... 56/17.1, 15.9, 56/15.8, 15.7, 16.3, 14.9, DIG. 22

[56] References Cited

U.S. PATENT DOCUMENTS

| | | | |
|---|---|---|---|
| 3,706,188 | 12/1972 | Quiram | 56/DIG. 22 X |
| 3,874,150 | 4/1975 | Boeck | 56/17.1 |
| 4,291,522 | 9/1981 | Kawasaki et al. | 56/17.1 X |
| 4,679,382 | 7/1987 | Saruhashi et al. | 56/DIG. 22 X |
| 4,760,687 | 8/1988 | Siegrist | 56/DIG. 22 X |

*Primary Examiner*—H. Shackelford
*Attorney, Agent, or Firm*—Pillsbury Madison & Sutro LLP

[57] ABSTRACT

An arrangement is provided for leveling the blade housing of a mower. The housing is suspended from the underside of a vehicle frame by pairs of connecting links pivotally connected to the housing and the frame. A pair of fixed plates, secured to opposite sides of the housing, are joined by pivotal connections to respective adjusting plates. The associated pairs of fixed and adjusting plates are provided with overlying slots which receive respective pins provided with locking structure which are selectively operable to lock the respective fixed and adjusting against movement relative to one another. At least one of the pins also extends through an aperture in a lift link. An operator-controlled lift lever is joined to a lift pin which passes through a slot in said lift link whereby actuation of the lift lever causes the housing to be raised or lowered. When lowered to engage the ground, unlocking of the pins permits the entire housing to be moved so as to be oriented with respect to the ground's surface whereby on re-locking of the pins and raising the housing, the housing is leveled relative to the ground.

21 Claims, 3 Drawing Sheets

ARRANGEMENT FOR LEVELING A MOWER HOUSING

This application claims benefit for Provisional application 60/043,007 Apr. 14, 1997.

BACKGROUND OF THE INVENTION

1. Field of the Invention

The present invention relates to arrangement for adjusting the orientation of a blade housing which is suspended on the underside of a rider type mower.

2. The Prior Art

The use of a mower suspended in non-grounding engaging relationship beneath the frame of a tractor or a rider type lawn mower is well known. In such arrangements the mower includes a housing for the mower's blade(s), the housing being linked to the frame of the vehicle. Such linkage typically is adjustable so that the height of the blade relative to the underlying terrain can be set selectively in order to achieve the desired cut.

An important consideration in obtaining proper cutting of vegetation over which the mower moves is that the blade-supporting housing be leveled so that the blade's cutting path is of uniform height from front to rear and from side to side. Known implements having means for orienting the blade housing so that it is appropriately suspended over the ground typically require tools for making adjustments in the housing's orientation. Additionally, the adjustment process often in complex and physically demanding whereby it is difficult, if not impossible, for many users to adjust the housing's orientation relative to the ground.

SUMMARY OF THE INVENTION

The present invention overcomes the shortcomings of conventional mower housing suspension arrangements by providing a toolless means to permit adjustment of the blade housing with a minimum requirement of skill and strength. More particularly, the housing is joined to the frame of the vehicle by pairs of links pivotally connected to the frame and to anchoring points on opposite sides of the housing, both fore and aft relative to the housing's direction of movement as it is transported by the vehicle. One pair of links are pivotally connected to respective adjusting plates which are pivotally joined to fixed plates secured to the housing. Mating fixed and adjusting plates are provided with overlying slots for receiving a pin which, in addition to passing through the overlying slots, passes through an aperture in a lift link. Each lift link includes a slot for receiving a lift pin projecting from an operator-adjustable lift lever.

The pins which pass through the overlying pains of slots are provided with adjustable locking knobs. When tightened to locking position, the knobs secure the adjusting plates to their respective fixed plates whereby when the lift lever is displaced in a direction to cause the lift pin to move into engagement with the end of the slot in the lift link, the housing is raised, as permitted by the links which pivotally connect the housing to the vehicle's frame. When the lift lever is moved in the opposite direction, the housing is lowered until at least a portion of it engages the ground. When this occurs, the lift pins are permitted to move along the slots in the lift link should the lift lever continue to be displaced in the direction which caused lowering of the housing. Once the housing engages the ground, loosening of the locking knobs disengages the fixed plates from the respective adjusting plates. This permits any remaining portion of the housing not engaging the ground to drop to ground level. At that point, tightening of the knobs re-secures the fixed and adjusting plates whereby when the lift lever is displaced to elevate the housing to a selected height above the ground, the housing and the housing-supported blade are uniformly oriented above the ground.

BRIEF DESCRIPTION OF THE DRAWINGS

The invention now will be described in greater detail with respect to the accompanying drawings, wherein.

DETAILED DESCRIPTION OF A PREFERRED EMBODIMENT OF THE INVENTION

Although the present invention may be employed with a tractor, the following description is of its use in association with a rider type lawn mower.

Figure 1:
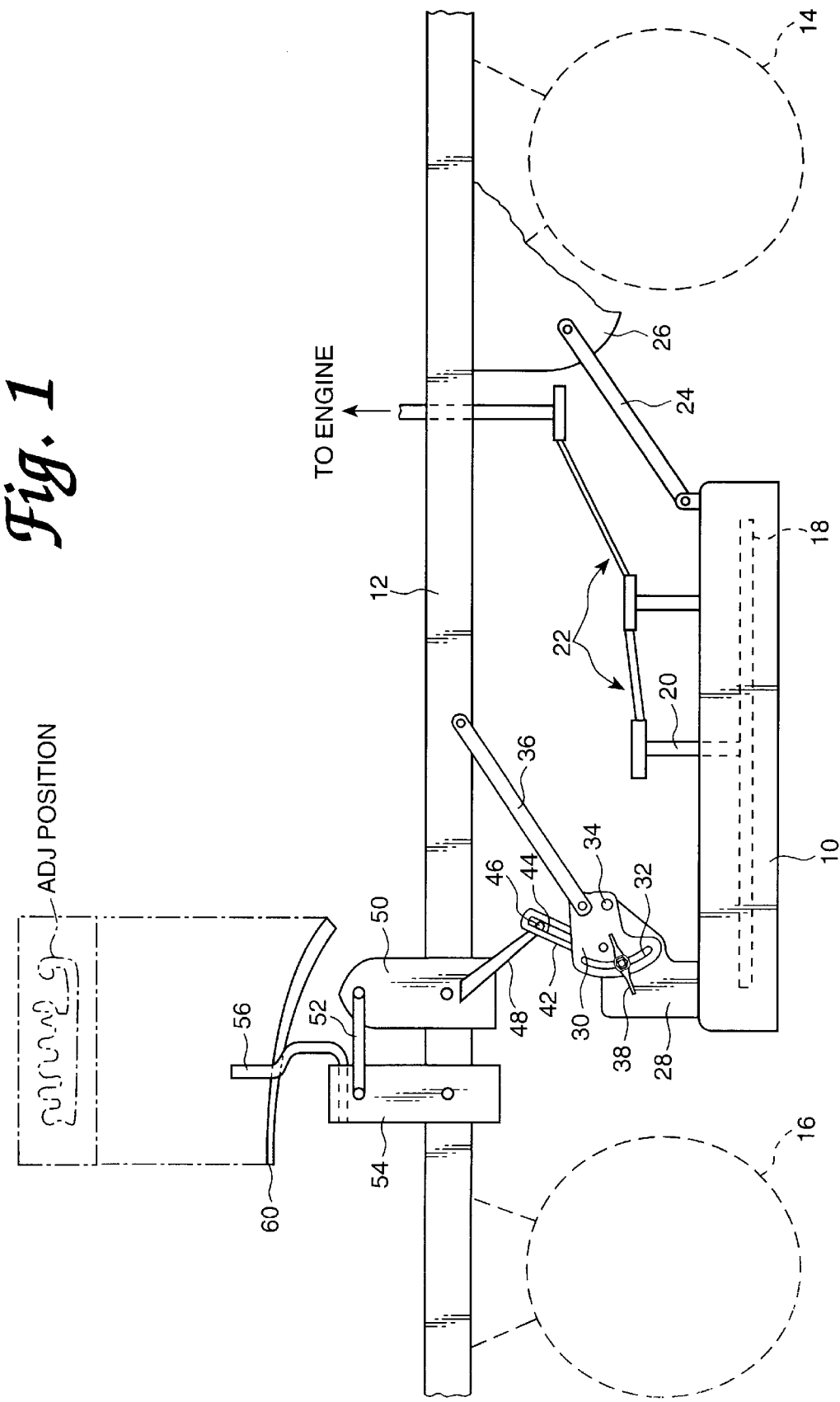
FIG. 1 is a side elevational view of an arrangement for leveling a mower housing according to the present invention.

Referring now to the drawings, FIG. 1 illustrates the mechanical linkage by which a mower blade housing 10 is adjusted so as to lie substantially in a plane parallel to the surface across which a mower traverses. For convenience of illustration, the details of the rider type mower supporting blade housing 10 are not shown. It will be understood, however, that the mower is a conventional type wherein the blade housing is suspended beneath the mower's frame 12 between the front and rear wheels 14 and 16.

A mower blade 18 is provided within housing 10 at the end of a blade drive shaft 20 which is rotated by a conventional belt and pulley arrangement 22 powered by an engine (not shown).

The forward end of the housing 10 is supported by a front connecting link 24 pivotally mounted to the housing, the opposite ends of the link being pivotally connected to a support 26 joined to the frame.

Figure 2:
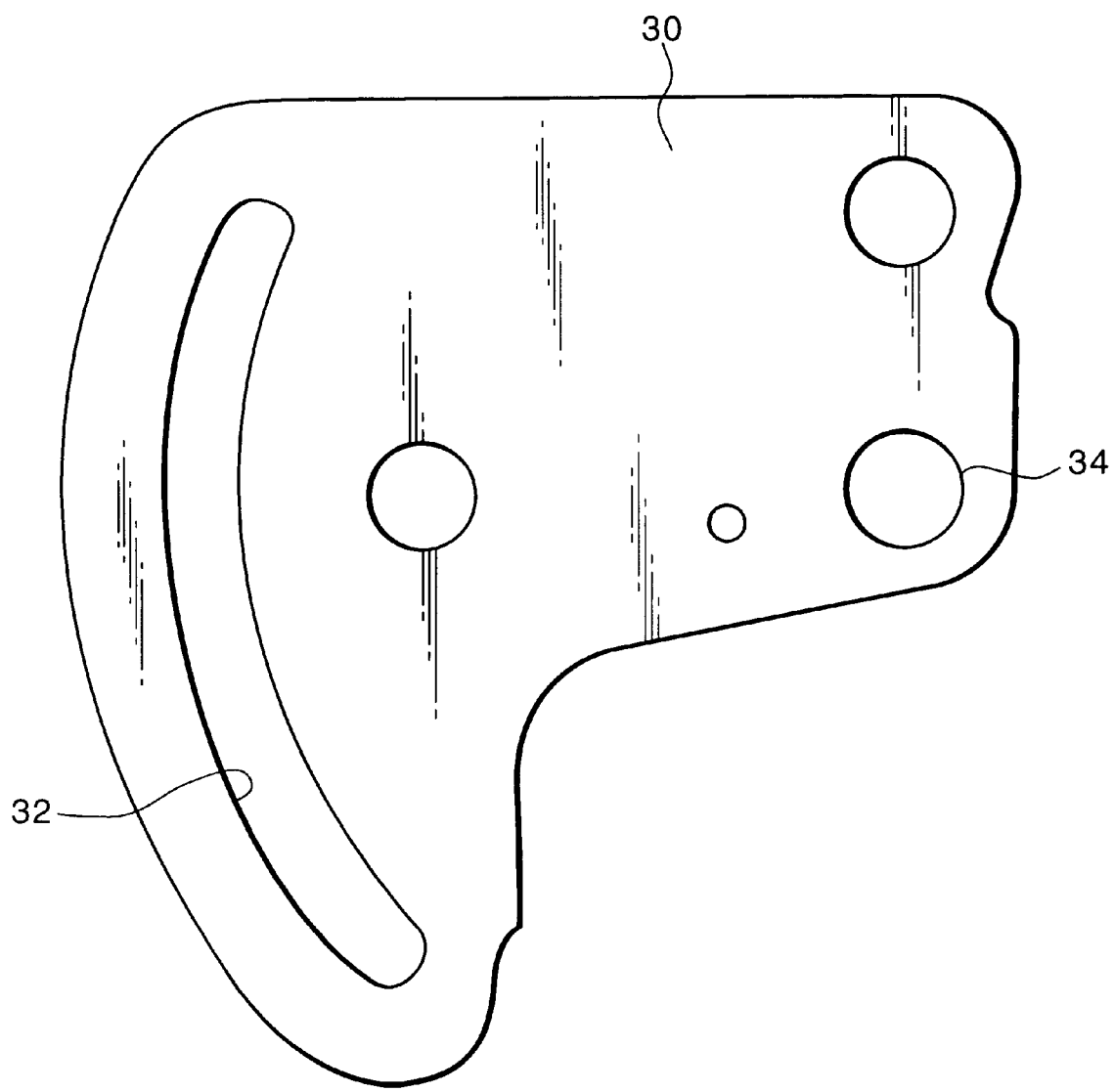
FIG. 2 is a side elevational view of an adjusting plate which forms a component of the leveling arrangement illustrated in FIG. 1.

Upright fixed plates 28 are provided on opposite sides of the rear end of blade housing 10. Each plate 28 has an adjusting plate 30 pivotally connected to it. Each plate 30—the details of which are shown in FIG. 2—is provided with an arcuate slot 32 the radius of which is the distance to the axis of the pivotal connection 34 of plate 30 to plate 28. A correspondingly radiused slot 35 is provided in each plate 28 such that slots 32 and 35 are in overlying relationship.

A rear pair of connecting links 36 connect plates 30 to the frame 12. More particularly, each link 36 is pivotally connected at one of its ends to its respective plate 30 and at its opposite end to the frame 12. Consequently, the rear end of the housing 10 is supported by the frame 12 through links 36. The pivotal connections of links 36 to the frame are located such that the longitudinal axis of each link 36 is substantially parallel to that of the corresponding link 24 on the same side of the housing.

Figure 3:
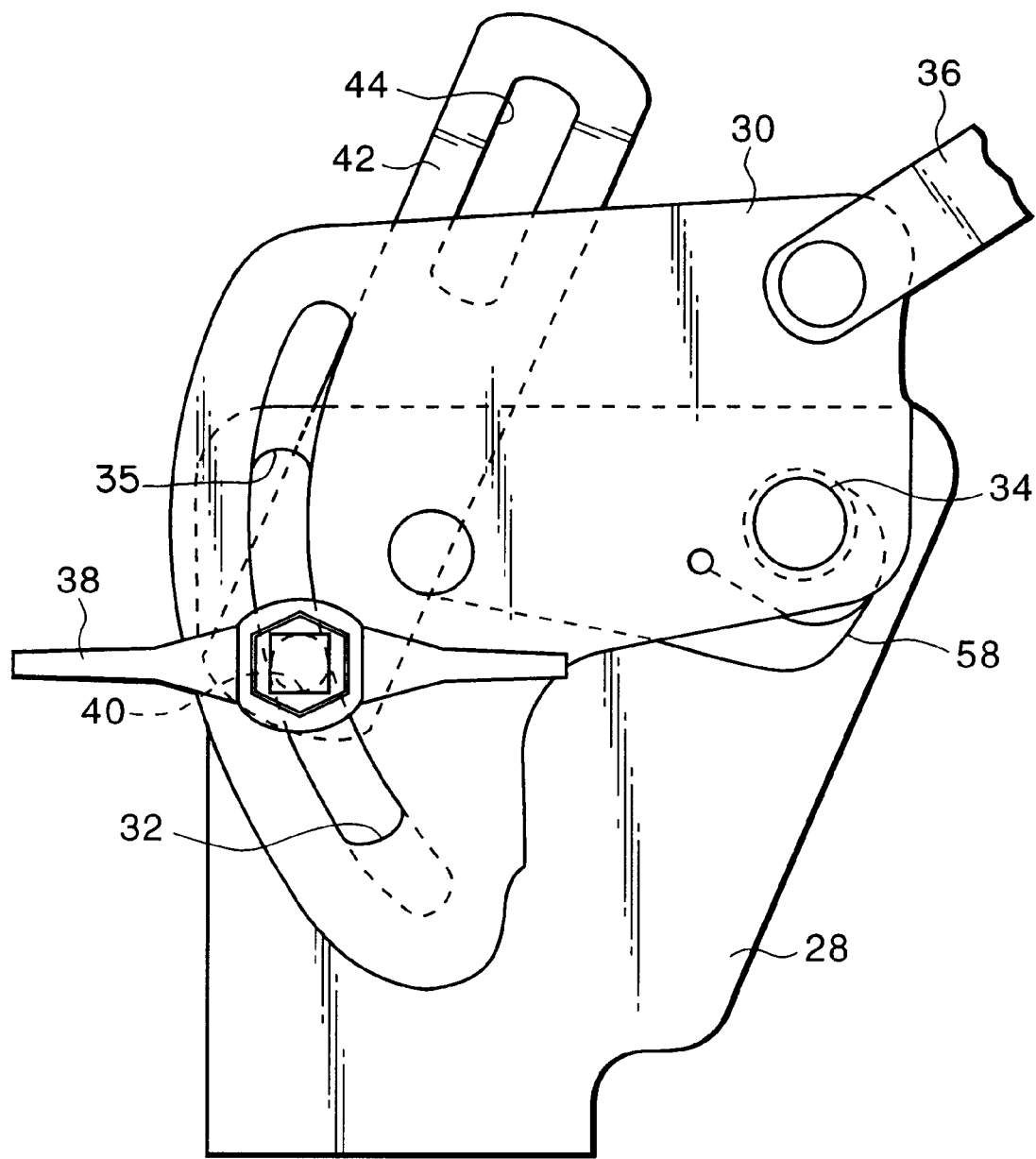
FIG. 3 is a side elevational view of multiple components of the leveling arrangement illustrated in FIG. 1.

The tension of the drive belt applied to the blade drive pulley, and the weight of the housing 10 centered forwardly of the rear supports for the housing, act together to cause links 36 to be in compression thereby reacting against the assembly now to be described with reference to FIG. 3.

A pin provided with an adjustable locking knob 38 at one of its ends extends through slots 32 and 35 of each mating pair of plates 30 and 28. Each pin also passes through an aperture 40 located at one end of lift links 42 (FIG. 3) located on opposite sides of the blade housing. By tightening knob 38 against a friction pad (not shown) located between the fixed plate 28 and plate 30, the mating plates 28 and 30 are held together in fixed relationship. However, link 42 is free to pivot about the pin. When the knob 38 is loosened, plate 30 is pivotally movable relative to its mating plate 28.

The opposite end of each lift link 42 is provided with an elongated slot 44 which receives a pin 46 which projects from one end of a lift lever 48. Lever 48 serves as an arm of a type of bellcrank device pivotally connected to the frame 12, the other arm of the bellcrank being a plate 50 to which lever 48 is fixedly secured.

The bellcrank is used to permit lever 48 to pivot about the bellcrank's connection to frame 12. To accomplish this, the upper end of plate 50 is connected to a corresponding location on a second plate 54 also pivotally joined to frame 12. A connecting rod 52 joins plates 50 and 54, rod 52 being pivotably attached to each plate. The upper end of plate 54 is joined to an operator controlled handle 56.

When the locking knobs 38 are tightened and handle 56 is moved rearwardly, lift lever 48 is rotated in a counter-clockwise direction about its pivot. As a result, the pins 46 move to the upper ends of slots, and the housing 10 is raised. Forward movement of handle 56 causes clockwise movement of lever 48 thereby lowering the housing. A detent 60 for selectively securing handle 56 allows housing 10 to be lifted by discrete selectable amounts.

When handle 56 is released from its detent and is moved into the forward most position of the detent (indicated as "ADJ POSITION" in Fig. 1), the blade housing is lowered until at least a portion of it rests on the ground. Such movement is permitted by the elongated slots 44 in the lift links. When the ground is engaged and both knobs 38 are loosened, coil springs 58 connected between respective mating pairs of plates 28 and 30 cause plate 30 to pivot relative to plate 28. Such loosening of the knobs also permits any bottom portion of the blade housing not already engaging the ground to do so. Retightening of the adjustment knobs and actuation of handle 56 causes the entire blade housing to be lifted uniformly from the ground such that the housing lies in the plane of the ground beneath the mower. Additionally, by utilizing the detent associated with the handle, the desired height of cut can be established.

As a result of the arrangement just described, the blade housing is easily adjusted to the underlying terrain so as to provide an improved quality of cut grass uniform from left to right and fore to aft across the width and length of cut. Because the reaction to the mower's drive belts counterbalances the weight of the blade housing, the clamp loads required to tighten knobs 38 are minimized to levels which can be achieved by hand.

What is claimed is:

1. An arrangement for leveling a blade housing of a mower, the housing during operation of the mower being suspended from the underside of a vehicle frame in non-engaging relationship with ground over which said vehicle moves, comprising:

a first pair of connecting links pivotally joined to respective opposite sides of a front portion of said housing and to said frame;

a pair of fixed plates secured to respective opposite sides of a rear portion of said housing;

a pair of adjusting plates each pivotally connected to a respective fixed plate, each of said adjusting plates including a slot overlying a correspondingly configured slot in said respective fixed plate;

a second pair of connecting links pivotally joined to said adjusting plates and to said frame;

a pair of pins passing through overlying slots in said fixed and adjusting plates, at least one of said pins additionally passing through an aperture of a lift link at its first end;

locking means associated with each of said pins for selectively locking respective fixed and adjusting plates against movement relative to each other while permitting the lift link to pivot about its second end in response to movement of a lift pin; and a lift lever joined to said frame and displaceably movable relative to the frame;

said lift pin being connected to said lift lever and movable when said lift lever is displaced, said lift pin being positioned within a slot in said lift link whereby when said lift pin is held against an upper end of the slot in the lift link while said fixed and adjusting plates are locked, the housing is selectively displaced towards or away from the ground in accordance with the direction of displacement of said lift lever and whereby when at least a portion of the housing is lowered into engagement with the ground and said fixed and adjusting plates are unlocked, the housing is released from suspension.

2. A blade housing leveling arrangement according to claim 1, wherein said first and second pairs of connecting links are substantially parallel to one another.

3. A blade housing leveling arrangement according to claim 1, wherein said slots in the fixed and adjusting plates are arcuate and each has a radius centered at the respective pivotal connection of said second connecting link and the adjusting plate.

4. A blade housing leveling arrangement according to claim 1, further comprising a spring-loaded connection between respective fixed and adjusting plates.

5. A blade housing leveling arrangement according to claim 1, wherein said locking means is a knob mounted on a threaded portion of each of said pins.

6. A blade housing arrangement according to claim 1, wherein said lift lever includes a bellcrank pivotally connected to said frame and having said lift pin connected to one end of the bellcrank and an operator actuated handle connected to the other end thereof.

7. A blade housing arrangement according to claim 1, further comprising a tensioned drive belt joined to a blade drive shaft, said belt asserting a force on the drive shaft and the housing which counterbalances the weight of the housing.

8. A blade housing arrangement according to claim 2, wherein said slots in the fixed and adjusting plates are arcuate and each has a radius centered at the respective pivotal connection of said second connecting link and the adjusting plate.

9. A blade housing leveling arrangement according to claim 2, wherein said locking means is a knob mounted on a threshold portion of each of said pins.

10. A blade housing arrangement according to claim 2, wherein said lift lever includes a bellcrank pivotally connected to said frame and having said lift pin connected to one end of the bellcrank and an operator actuated handle connected to the other end thereof.

11. A blade housing arrangement according to claim 2, further comprising a tensioned drive belt joined to a blade drive shaft, said belt asserting a force on the drive shaft and the housing which counterbalances the weight of the housing.

12. A blade housing arrangement according to claim 3, further comprising a spring-loaded connection between respective fixed and adjusting plates.

13. A blade housing arrangement according to claim 3, wherein said locking means is a knob mounted on a threaded portion of each of said pins.

14. A blade housing according to claim 3, wherein said lift lever includes a bellcrank pivotally connected to said frame and having said lift pin connected to one end of the bellcrank and an operator actuated handle connected to the other end thereof.

15. A blade housing arrangement according to claim 3, further comprising a tensioned drive belt jointed to a blade drive shaft, said belt asserting a force on the drive shaft and the housing which counterbalances the weight of the housing.

16. A blade housing according to claim 14, further comprising a spring-loaded connection between respective fixed and adjusting plates.

17. A blade housing according to claim 14, wherein said locking means is a knob mounted on a threaded portion of each of said pins.

18. A blade housing arrangement according to claim 14, further comprising a tensioned drive belt joined to a blade drive shaft, said belt asserting a force on the drive shaft and the housing which counterbalances the weight of the housing.

19. A blade housing arrangement according to claim 15, further comprising a spring-loaded connection between respective fixed and adjusting plates.

20. A blade housing arrangement according to claim 15, wherein said locking means is a knob mounted on a threaded portion of each of said pins.

21. A blade housing leveling arrangement according to any one of claims 6, 10 or 14, further comprising detent means operatively associated with said handle, said detent means having multiple detents to permit retention of the handle at selected different positions thereby retaining the lift lever at desired locations relative to the frame.

* * * * *